US012722125B2

(12) United States Patent
Takashina et al.

(10) Patent No.: US 12,722,125 B2
(45) Date of Patent: Sep. 1, 2026

(54) CATION EXCHANGE MEMBRANE AND METHOD FOR PRODUCING SAME

(71) Applicant: ASTOM CORPORATION, Tokyo (JP)

(72) Inventors: Naoto Takashina, Shunan-city (JP); Masayuki Kishino, Shunan-city (JP); Kenji Fukuta, Shunan-city (JP)

(73) Assignee: ASTOM CORPORATION, Tokyo (JP)

( * ) Notice: Subject to any disclaimer, the term of this patent is extended or adjusted under 35 U.S.C. 154(b) by 927 days.

(21) Appl. No.: 17/912,469

(22) PCT Filed: Mar. 8, 2021

(86) PCT No.: PCT/JP2021/008905

§ 371 (c)(1),
(2) Date: Sep. 16, 2022

(87) PCT Pub. No.: WO2021/192951

PCT Pub. Date: Sep. 30, 2021

(65) Prior Publication Data

US 2023/0166219 A1 Jun. 1, 2023

(30) Foreign Application Priority Data

Mar. 25, 2020 (JP) ................................ 2020-054653

(51) Int. Cl.

*B01D 67/00* (2006.01)
*B01D 69/02* (2006.01)
*B01D 69/10* (2006.01)
*B01D 71/28* (2006.01)
*B01D 71/30* (2006.01)
*B01J 39/05* (2017.01)
*B01J 39/20* (2006.01)
*B01J 47/127* (2017.01)
*C08J 5/22* (2006.01)

(52) U.S. Cl.

CPC ......... *B01D 67/0006* (2013.01); *B01D 69/02* (2013.01); *B01D 69/1071* (2022.08); *B01D 71/281* (2022.08); *B01D 71/301* (2022.08); *B01J 39/05* (2017.01); *B01J 39/20* (2013.01); *B01J 47/127* (2017.01); *C08J 5/2243* (2013.01); *B01D 2325/22* (2013.01); *B01D 2325/24* (2013.01); *B01D 2325/26* (2013.01); *B01D 2325/42* (2013.01); *C08J 2325/12* (2013.01); *C08J 2423/06* (2013.01); *C08J 2427/06* (2013.01)

(58) Field of Classification Search

CPC ................ B01D 67/0006; B01D 69/02; B01D 69/1071; B01D 71/281; B01D 71/301; B01D 2325/22; B01D 2325/24; B01D 2325/26; B01D 2325/42; B01J 39/05; B01J 39/20; B01J 47/127; C08J 5/2243; C08J 2325/12; C08J 2423/06; C08J 2427/06; C08J 5/2231; C08J 2323/06; C08J 2425/18; Y02A 20/124; Y02E 60/50

See application file for complete search history.

(56) References Cited

U.S. PATENT DOCUMENTS

2019/0118144 A1 4/2019 Kishino
2019/0176098 A1 6/2019 Kinoshita et al.
2021/0187446 A1 6/2021 Kinoshita et al.

FOREIGN PATENT DOCUMENTS

| | | | | |
|---|---|---|---|---|
| EP | 3444295 A1 | | 2/2019 | |
| EP | 3778000 A1 | | 2/2021 | |
| JP | S57-34017 A | | 2/1982 | |
| JP | 2008-045068 A | | 2/2008 | |
| JP | 2009096923 A | * | 5/2009 | |
| JP | 2017-190417 A | | 10/2017 | |
| JP | H6-329815 A | | 5/2018 | |
| KR | 10-2019-0053177 A | | 5/2019 | |
| WO | WO-2017179672 A1 | * | 10/2017 | ............ B01D 71/82 |
| WO | 2019/188596 A1 | | 10/2019 | |

OTHER PUBLICATIONS

English translation of JP_2009096923 (Year: 2009).*
"Organ Biochemical Pharmaceutical Technology," Edited by Shandong Medical College, Published by Shandong Medical College, College, pp. 100-102 (Jan. 31, 1979).
CN Office Action dated Jan. 27, 2024 as received in Application No. 202180021608.0.

* cited by examiner

*Primary Examiner* — Terry K Cecil
(74) *Attorney, Agent, or Firm* — Maschoff Brennan

(57) ABSTRACT

A cation-exchange membrane using a polyolefin-based substrate with reduced swelling of an ion-exchange resin and a low electrical resistance is provided. The cation-exchange membrane of the present invention includes a substrate made of polyolefin-based woven fabric, and a sulfonic acid group-containing cation-exchange resin. A portion of the cation-exchange membrane other than the substrate has 23 mass % or more to 35 mass % or less of polyvinyl chloride.

3 Claims, No Drawings

CATION EXCHANGE MEMBRANE AND METHOD FOR PRODUCING SAME

TECHNICAL FIELD

The present invention relates to a cation-exchange membrane and a method for producing the same.

BACKGROUND ART

Ion-exchange membranes are membranes made of ion-exchange resin, but are mechanically brittle due to their crosslinked structure. Therefore, to improve mechanical strength, a porous substrate that functions as a reinforcing material is used, and this substrate is used as a core in a structure with an ion-exchange resin layer. As a method of producing such an ion-exchange membrane, a so-called paste method is known. According to the paste method, an ion-exchange membrane is produced by applying, to a substrate which functions as a reinforcing material, a polymerizable monomer paste which contains an ion-exchange group or into which an ion-exchange group is introducible, then polymerizing the monomer, and thereafter introducing an ion-exchange group if necessary (e.g., see Patent Document 1).

As the substrate which functions as a reinforcing material, polyolefin-based resin or polyvinyl chloride is commonly used. The polyolefin-based resin is superior to polyvinyl chloride in terms of alkali resistance, strength, and heat resistance. Thus, as a substrate of the ion-exchange membrane to be used in a region where alkali resistance, strength, and heat resistance are required, the polyolefin-based resin is used. Such a polyolefin-based resin substrate is often used in a form of woven fabric, nonwoven fabric, a porous sheet, or the like.

The polyolefin-based resin substrate is superior in terms of alkali resistance, strength, and heat resistance. However, the polyolefin-based resin substrate has a disadvantage of poor adhesion to ion-exchange resin obtained by polymerizing a polymerizable monomer and then introducing an ion-exchange group thereinto if necessary. Therefore, the expansion and deformation of the ion-exchange resin cannot be reduced and for example, the substrate and the ion-exchange membrane are easily detached from each other by repeated bending, which deteriorates function as an ion-exchange membrane.

Therefore, as described in Patent Document 2, a technique of polymerizing a polymerizable monomer at 110° C. or higher to increase adhesion, thereby improving flexibility of the ion-exchange membrane has been found.

CITATION LIST

Patent Documents

Patent Document 1: Japanese Unexamined Patent Publication No. H6-329815

Patent Document 2: Japanese Unexamined Patent Publication S57-34017

SUMMARY OF THE INVENTION

Technical Problem

However, when the polymerization is performed at 110° C. or higher, there are the following problems. The polyolefin-based resin substrate itself is damaged, thereby reducing the strength of the polyolefin-based resin substrate. If the substrate is made thicker to maintain the strength, the membrane resistance (electrical resistance) as the ion-exchange membrane is increased.

The present invention was made in view of these points, and is intended to provide a cation-exchange membrane using a polyolefin-based substrate with reduced swelling of an ion-exchange resin and a small electrical resistance.

Solution to the Problem

The cation-exchange membrane of the present invention includes a substrate made of polyolefin-based woven fabric, and a sulfonic acid group-containing cation-exchange resin. A portion of the cation-exchange membrane other than the substrate contains 23 mass % or more to 35 mass % or less of polyvinyl chloride.

The cation-exchange membrane may have an electrical resistance measured using 0.5M NaCl solution at 25° C. of 1.5 $\Omega\cdot cm^2$ or more to 3.5 $\Omega\cdot cm^2$ or less, a bursting strength of 0.5 MPa or more to 1.2 MPa or less, a thickness of the substrate of 90 μm or more to 160 μm or less, and an open area ratio of the substrate of 35% or more to 50% or less. The substrate may be made of polyethylene-based woven fabric of monofilament The cation-exchange resin may be a polystyrene-based cation-exchange resin.

The cation-exchange resin may contain an α-alkylstyrene derived component.

The method of producing a cation-exchange membrane according to the present invention includes: impregnating voids of a substrate made of polyolefin-based woven fabric with a polymerizable composition for forming a cation-exchange resin, the polymerizable composition containing a polymerization initiator, polyvinyl chloride, and a monomer component which contains a cross-linkable monomer and a monomer containing a sulfonic acid group-introducible functional group or a sulfonic acid group; and copolymerizing the monomer component in the polymerizable composition for forming the cation-exchange resin after the immersing. The polymerizable composition for forming the cation-exchange resin contains 55 parts by mass or more to 98 parts by mass or less of the polyvinyl chloride relative to 100 parts by mass of the monomer component.

The copolymerizing is performed preferably at 40° C. or higher to lower than 80° C. in a preferred embodiment.

The substrate may be made of polyethylene-based woven fabric of monofilament

The monomer containing the sulfonic acid group-introducible functional group or the sulfonic acid group may be a styrene-based monomer containing a sulfonic acid group-introducible functional group or a sulfonic acid group.

The monomer component may include α-alkylstyrene, and the content of the α-alkylstyrene may be 1 mass % or more to 13 mass % or less relative to the entire monomer component.

Advantages of the Invention

In the cation-exchange membrane of the present invention, the substrate is made of the polyolefin-based woven fabric, and the portion of the cation-exchange membrane other than the substrate contains 23 mass % or more to 35 mass % or less of polyvinyl chloride. This enables both a reduction in swelling of the ion-exchange resin and a low electrical resistance.

DESCRIPTION OF EMBODIMENTS

The following describes embodiments of the present invention in detail. The following description of preferred embodiments is a mere example in nature, and is not intended to limit the present invention or applications or use thereof.

First Embodiment

As described in the section of background art, the substrate used for the cation-exchange membrane is polyolefin-based resin or polyvinyl chloride. In a case where alkali resistance, strength, and heat resistance are necessary in the cation-exchange membrane, a polyolefin-based resin has been used, and polyvinyl chloride has not been selected in such a case. However, when the substrate of the polyolefin-based resin is used, the adhesion to the cation-exchange resin is poor. This causes a problem in that the cation-exchange resin is detached from the substrate when it absorbs water and swells. The present inventors have conducted various studies to solve such a problem, and conceived of using a substrate of polyolefin-based woven fabric and polyvinyl chloride, thereby configuring the invention of the present invention.

The cation-exchange membrane of a first embodiment includes: a substrate made of polyolefin-based woven fabric; and a cation-exchange resin containing a sulfonic acid group as a cation-exchange group. A portion of the cation-exchange membrane other than the substrate contains 23 mass % or more to 35 mass % or less of polyvinyl chloride.

<Polyolefin-Based Woven Fabric>

Examples of polyolefin include a homopolymer of α-olefin such as ethylene, propylene, 1-butene, and 4-methyl-1-pentene, and random or block copolymers thereof. Specific examples thereof include low-density polyethylene, high-density polyethylene, polypropylene, poly1-butene, and poly4-methyl-1-pentene. Among them, the polyolefin is preferably low-density polyethylene, high-density polyethylene, or polypropylene, most preferably a polyethylene-based polymer such as low-density polyethylene and high-density polyethylene in terms of availability and resistance to chemicals.

The polyolefin-based substrate may be in any form such as woven fabric, nonwoven fabric, or a porous film, but is preferably woven fabric in terms of strength. The open area ratio of the woven fabric is preferably 35% or more to 50% or less. As a single yarn of the woven fabric, either a multifilament or a monofilament can be used, but the monofilament is preferable in terms of reducing the contact area with the ion-exchange resin, i.e., reducing the gap between the ion-exchange resin and the substrate. The polyolefin-based woven fabric has a thickness of preferably 90 μm or more to 160 μm or less, and a diameter of the single yarn of preferably 1 denier to 70 denier (10 μm to 100 μm) in terms of balancing the strength and the membrane resistance although they may be selected as appropriate according to the intended use.

<Cation-Exchange Resin>

The sulfonic acid group-containing cation-exchange resin which forms a cation-exchange membrane is well known one and is, for example, one obtained by introducing a sulfonic acid group into resin which forms a skeleton. Examples of the resin which forms a skeleton include hydrocarbon-based resin such as a polymer obtained by polymerizing a monomer having an unsaturated double bond based on ethylene such as vinyl, styrene, and acryl, and copolymers thereof, and a polymer having an aromatic ring in a main chain such as polysulfone, polyphenylene sulfide, polyether ketone, polyether ether ketone, polyetherimide, polyphenylene oxide, polyether sulfone, and polybenzimidazole. The resin which forms a skeleton is preferably styrene-based cation-exchange resin mainly containing a styrene-based monomer.

The sulfonic acid group is specified as a cation-exchange group. The sulfonic acid group is a strongly acidic group, and is negatively charged in an aqueous solution, thereby exhibiting strong cation exchangeability. Thus, the cation-exchange membrane containing the sulfonic acid group can be particularly advantageously used in various applications necessary to exhibit cation exchangeability. On the other hand, the affinity with the polyolefin-based resin substrate becomes low, so that the problem of poor adhesion becomes more remarkable. This poor adhesion is favorably improved by blending a specific amount of polyvinyl chloride to the cation-exchange resin. This allows the effect of the present invention to be exhibited particularly remarkably, which is preferable.

<Polyvinyl Chloride>

As the polyvinyl chloride, known ones can be used without limitations. For example, not only a homopolymer of vinyl chloride monomer, but also a copolymer of vinyl chloride monomer and another monomer can be used as long as properties as polyvinyl chloride and the purpose of the present embodiment are not impaired. A monomer copolymerizable with the vinyl chloride monomer includes α-olefins such as ethylene and propylene, and vinyl esters such as vinyl acetate. Of course, these polyvinyl chlorides may be used alone or in combination of two or more of them.

The polyvinyl chloride has a chlorine content in a range of 30 mass % to 80 mass %, particularly suitably 55 mass % to 70 mass %. The polyvinyl chloride with a chlorine content in this range has high affinity for styrene, and thus advantageous in the adhesion mechanism.

In terms of heat resistance, the polyvinyl chloride suitably has a high softening point, e.g., the Clash-Berg softening temperature (JIS K 6734) of 60° C. or higher, preferably 65° C. or higher. This is because the polyvinyl chloride with a Clash-Berg softening temperature in such a range can maintain high adhesion even at high temperatures, which enables stable electrodialysis without detachment of the membrane during electrodialysis under high temperature conditions. The Clash-Berg softening temperature is generally 70° C. or lower.

The average degree of polymerization of polyvinyl chloride is not particularly limited, and is generally in a range of preferably 500 to 3000, particularly preferably 800 to 2000. The longer the molecular chain of polyvinyl chloride is, the greater the degree of entanglement with molecules such as cation-exchange resin and the higher the adhesion, but if the molecular chain is too long, solubility of the polyvinyl chloride in solvents decreases. With the average degree of polymerization in this range, high adhesion is obtained, and a cation-exchange membrane free from leakage can be obtained.

The polyvinyl chloride may be used in a known form such as a powder or a pellet, but is preferably a powder, more preferably a powder having an average particle diameter of 0.1 μm to 30 μm measured by a laser diffraction scattering method. This is because polyvinyl chloride powder has good compatibility with resin forming a skeleton to be described later and is easily dispersed uniformly. Such a polyvinyl chloride powder can be obtained by known suspension polymerization.

Polyvinyl chloride has extremely high affinity for a monomer such as styrene or a crosslinking agent component such as divinylbenzene. Thus, the cation-exchange resin used is particularly preferably sulfonated styrene-divinylbenzene copolymer. Polymerization is proceeded with polyvinyl chloride being compatible with a monomer containing a sulfonic acid group, a monomer containing a sulfonic acid group-introducible reactive group, or a cross-linkable monomer. Thus polyvinyl chloride is entangled with molecular chains of the cation-exchange resin, so that detachment of the polyvinyl chloride is effectively reduced, and swelling of the ion-exchange resin is effectively reduced by the polyvinyl chloride.

A portion of the cation-exchange membrane (dry mass) other than the substrate needs to contain 23 mass % or more to 35 mass % or less of polyvinyl chloride. The polyvinyl chloride content is preferably 24 mass % or more to 32 mass % or less, more preferably 25 mass % or more to 29 mass % or less. When the polyvinyl chloride content is too small, the cation-exchange membrane swells greatly and is easily detached, and when it is too large, disadvantages such as an increase in electrical resistance of the membrane may occur.

In particular, the resistance of the cation-exchange membrane is 1.5 $\Omega \cdot cm^2$ or more to 3.5 $\Omega \cdot cm^2$ or less, preferably 1.5 $\Omega \cdot cm^2$ or more to 3.2 $\Omega \cdot cm^2$ or less, more preferably 1.5 $\Omega \cdot cm^2$ or more to 3.0 $\Omega \cdot cm^2$ or less, in terms of efficient electrodialysis or the like.

The detachment of the resin causes an increase in the water permeation rate and reduces current efficiency and the like in electrodialysis. As the water permeation rate, a value measured using pressured water at 0.1 MPa is 600 ml/($m^2 \cdot hr$) or less, preferably 500 ml/($m^2 \cdot hr$) or less, more preferably 300 ml/($m^2 \cdot hr$) or less.

<Method of Producing Cation-Exchange Membrane>

The cation-exchange membrane according to the present embodiment is produced as follows.

A polymerizable curable component for forming a cation-exchange resin, such as a monomer containing a sulfonic acid group, a cross-linkable monomer, and a polymerization initiator is blended with polyvinyl chloride, thereby preparing a polymerizable composition. Polyolefin-made woven fabric which is a substrate is immersed in the polymerizable composition to fill voids of the woven fabric, and then polymerized and cured, thereby producing cation-exchange resin. Accordingly, an intended cation-exchange membrane can be obtained.

The polymerization curing temperature is set to be preferably much lower than the melting point of the polyolefin-based woven fabric in order to reduce thermal deterioration of the polyolefin-based woven fabric. Although it depends on the types of the polyolefin and the polymerizable curable component and the polymerization curing time, the upper limit of the polymerization curing temperature is preferably 40° C. lower than the melting point of the polyolefin configuring the substrate. Specifically, the polymerization curing temperature is preferably 40° C. or higher to lower than 80° C., more preferably 50° C. or higher to lower than 80° C. If polymerization is performed at excessively low temperatures, the polymerization of monomers does not progress sufficiently, and unpolymerized content increases, causing voids which cause elution. This may lead to a reduction in current efficiency. On the other hand, if polymerization is performed at excessively high temperatures, the high temperatures may exceed the melting point of the polyolefin. This may lead to a reduction in strength of the substrate based on the polyolefin-based resin.

In the polymerizable curable component, a monomer containing a sulfonic acid group may be a commonly used one for producing a cation-exchange resin. Examples thereof include sulfonic acid-based monomers such as α-halogenated vinylsulfonic acid, styrenesulfonic acid, and vinylsulfonic acid, and salts and esters thereof. The content of the monomer containing a sulfonic acid group is preferably 30 mass % or more to 98 mass % or less, more preferably 40 mass % or more to 90 mass % or less relative to the entire monomer component. The monomer preferably partially contains α-alkylstyrene, and the content of α-alkylstyrene is preferably 1 mass % or more to 13 mass % or less relative to the entire monomer component. The α-alkylstyrene contained can reduce rapid progression of the polymerization, and can reduce a sudden increase in the polymerization curing temperature above the intended temperature.

The cross-linkable monomer is used for densifying the cation-exchange resin and enhancing swelling prevention properties, membrane strength, and the like, and is not particularly limited, but examples thereof include divinyl compounds such as divinylbenzene, divinylsulfone, butadiene, chloroprene, divinylbiphenyl, trivinylbenzenes, vinylnaphthalene, diallylamine, and divinylpyridines. Such a cross-linkable monomer is blended generally in a content of preferably 0.1 mass % to 50 mass %, more preferably 1 mass % to 40 mass % relative to the entire monomer component.

In addition to the monomer containing a sulfonic acid group and the cross-linkable monomer described above, other monomers which can be polymerized with these monomers may further be added if necessary. Examples of the other monomers include styrene, chloromethyl styrene, acrylonitrile, methylstyrene, ethylvinylbenzene, acrolein, methylvinylketone, and vinylbiphenyl. The amount of the other monomers blended varies depending on the purpose of addition, but is generally preferably 0 mass % to 50 mass %, and preferably 5 mass % to 40 mass % especially in a case where flexibility is imparted, relative to the entire monomer component.

The polymerization initiator can be any of known ones without particular limitations, but is preferably one with a 10 hour half-life temperature of lower than 80° C. Specifically, organic peroxides such as diisobutyl peroxide, di(3,5,5-trimethylhexanoyl)peroxide, dilauroyl peroxide, succinic acid peroxide, and benzoyl peroxide are used. The amount of the polymerization initiator blended is preferably 0.1 parts by mass to 20 parts by mass, more preferably 0.5 parts by mass to 10 parts by mass relative to 100 parts by mass of the monomer component.

Polyvinyl chloride is blended with the polymerizable curable component described above so that the resultant cation-exchange membrane has composition described above, thereby preparing a polymerizable composition. Specifically, the amount of the polyvinyl chloride (preferably, a polyvinyl chloride powder) blended is preferably 55 parts by mass or more to 98 parts by mass or less relative to 100 parts by mass of the monomer component. The content of the polyvinyl chloride blended is more preferably 57 parts by mass or more to 86 parts by mass or less, particularly preferably 60 parts by mass or more to 75 parts by mass or less. The method of blending the polyvinyl chloride is not particularly limited, and may be stirring the polyvinyl chloride together with polymerizable curable component so as to produce a homogeneous polymerizable composition or stirring and blending them while heating at a temperature at which the polymerization of the polymerizable curable component does not progress, specifically at 40° C. or lower.

The polymerizable composition may further contain chlorinated polyolefin, a thickener, known additives, and the like, if necessary.

The thickener includes: saturated aliphatic hydrocarbon-based polymers such as a polyolefin powder with an average particle diameter of 10 μm or less, an ethylene-propylene copolymer, and polybutylene; and styrene-based polymers such as a styrene-butadiene copolymer. The use of such a thickener allows adjustment of the viscosity in the range where dripping can be effectively prevented during formation of the membrane.

The additives include plasticizers such as dioctyl phthalate, dibutyl phthalate, tributyl phosphate, acetyl tributyl citrate, and an alcohol ester of fatty acid or aromatic acid, and hydrochloric acid scavengers such as styrene oxide and ethylene glycol diglycidyl ether. The amount of the additives blended varies depending on the purpose of addition, but is 0.1 parts by mass to 50 parts by mass, particularly preferably 0.5 parts by mass to 30 parts by mass relative to 100 parts by mass of the monomer component.

The method of impregnating voids of the substrate which is polyolefin-based woven fabric with the polymerizable composition is not particularly limited. For example, the impregnation is performed by immersing the polyolefin-based substrate in a tank filled with the polymerizable composition. As a matter of course, the impregnation with the polymerizable composition may be performed by other methods such as spray application and application with a doctor blade instead of immersing.

The polymerizable composition in which the polyolefin-based woven fabric is impregnated is heated, copolymerized, and cured in a polymerizer such as a heating oven.

In the polymerizing, a method of sandwiching the polyolefin-based woven fabric filled with the polymerizable composition between films such as polyester and heating the resultant from room temperature under pressure is employed in general. The pressurization is performed generally at a pressure of about 0.1 MPa to about 1.0 MPa with an inert gas such as nitrogen gas, a roll, or the like. By this pressurization, the polymerization is performed with excessive polymerizable composition at the outer interface of the polyolefin-based woven fabric pushed into voids of the polyolefin-based woven fabric, whereby a resin pool is effectively reduced.

Other polymerization conditions depend on the type and the like of the polymerizable curable component, and can be determined by selecting from known conditions, as appropriate. The polymerization temperature is, as mentioned above, set to be significantly lower than the melting point of the polyolefin-based woven fabric (specifically, 40° C. or higher to lower than 80° C.), and the polymerization time varies depending on the polymerization temperature and the like, but is generally about 3 hours to about 20 hours. Upon completion of the polymerization and curing, a cation-exchange membrane supported on the polyolefin-based woven fabric is obtained.

In the present embodiment, a cation-exchange membrane can be formed by using the polymerizable curable component for forming a cation-exchange resin precursor resin containing a sulfonic acid group-introducible reactive group in place of the polymerizable curable component for forming a cation-exchange resin. Specifically, in place of the monomer containing a sulfonic acid group, a monomer containing a sulfonic acid group-introducible reactive group is blended to the polymerizable composition to produce a cation-exchange membrane precursor. In this case, the cation-exchange membrane precursor may be produced in the same manner as in the case of blending the monomer containing a sulfonic acid group except that sulfonic acid group introduction to be described below is additionally performed.

The monomer containing a sulfonic acid group-introducible reactive group may be commonly used one in order to produce the cation-exchange resin. Examples thereof include styrene, methylstyrene, vinylxylene, ethylvinylbenzene, α-alkylstyrene (specifically, α-methylstyrene), vinyl naphthalene, and α-halogenated styrenes. The monomer preferably partially contains α-alkylstyrene, and the content of α-alkylstyrene is preferably 1 mass % or more to 13 mass % or less relative to the entire monomer component.

In addition to the monomer containing a sulfonic acid group-introducible reactive group and a cross-linkable monomer, other monomers may be used if necessary. The other monomers include chloromethyl styrene, acrylonitrile, acrolein, methylvinylketone, and the like.

The sulfonic acid group introduction is performed after the polymerizable composition is polymerized and cured to obtain a membrane of the cation-exchange resin precursor resin. In this introduction, for sulfonation and chlorosulfonation, concentrated sulfuric acid or chlorosulfonic acid as a sulfonic acid group introducing agent is acted on, or hydrolysis is performed on the resultant precursor resin, to introduce a sulfonic acid group. Accordingly, an intended cation-exchange membrane can be obtained.

In the present embodiment, it is suitable to use the polymerizable curable component for forming a cation-exchange resin precursor resin. This is because the present embodiment has an important feature in that a cation-exchange membrane is formed of a polymerizable composition obtained by adding polyvinyl chloride to the polymerizable curable component, and the polyvinyl chloride exhibits higher solubility in the polymerizable curable component containing no sulfonic acid group than in polymerizable curable component containing a sulfonic acid group introduced.

The cation-exchange membrane produced as described above has a thickness suitably in a range of 100 μm to 300 μm. If the thickness is too small, the strength of the cation-exchange membrane may be greatly reduced. If the thickness is too large, a disadvantage such as an increase in electrical resistance may occur.

The filament diameter and the thickness of the polyolefin-based woven fabric, the amount of the cross-linkable monomer blended in the polymerizable curable component, and the like are adjusted so that the cation-exchange membrane has a bursting strength of 0.5 MPa or more to 1.2 MPa or less although depending on the thickness.

In the cation-exchange membrane according to the present embodiment, the polyolefin-based woven fabric is used as the substrate, and a portion other than the substrate contains 23 mass % or more to 35 mass % or less of polyvinyl chloride. Because of this large polyvinyl chloride content, the degree to which the cation-exchange membrane absorbs water and swells can be reduced, and detachment of the cation-exchange resin from the substrate can be reduced when monomers which are starting materials of the cation-exchange resin enter a polyvinyl chloride powder and the like, and are then copolymerized. Therefore, the strength of the entire cation-exchange membrane can be increased without increasing the thickness of the substrate. Further, the cation-exchange resin and polyvinyl chloride are integrated as described above. Thus, the increase in electrical resistance of the cation-exchange membrane can be reduced without filling voids of the substrate with polyvinyl chloride.

The cation-exchange membrane of the present invention with such properties can be effectively used in many fields such as electrodialysis membranes used in desalinating in the field of salt production or food, electrolyte membranes of fuel cells, and diffusion dialysis membranes used for acid recovery from acid containing metal ions generated in the iron and steel industry.

EXAMPLES

Advantageous effects of the present invention will be described below with reference to the following examples. In the examples and comparative examples, characteristics of the ion-exchange membrane were determined by the following measurement.

1) Polyvinyl Chloride Content in Cation-Exchange Resin

An ion-exchange membrane was dried under reduced pressure at 60° C. for 5 hours, and the dry weight (Dg) thereof was measured.

Subsequently, the same ion-exchange membrane was immersed in an aqueous 0.5 mol/1-$FeCl_2$ solution for 1 hour or longer, and then washed sufficiently with ion-exchange water. Thereafter, the ion-exchange membrane was immersed in 10 mass % hydrogen peroxide water for 6 hours or longer, and the resultant solid content was collected with a filter.

Subsequently, the solid content was then washed with acetone, thereby collecting a substrate. The substrate was then dried at 60° C. for 3 hours, and the dry weight (Bg) of the substrate was measured.

Subsequently, acetone was distilled off with an evaporator from the acetone cleaning solution, and the resultant solid content was analyzed by infrared spectroscopy to confirm that it was polyvinyl chloride. Then, the dry weight (Yg) of the resultant polyvinyl chloride was measured. Based on the measured values, the polyvinyl chloride content in the resin of the ion-exchange membrane was determined by the following equation.

$$\text{Polyvinyl Chloride Content}=100\times Y/(D-B)[\%]$$

2) Water Permeation Rate of Ion-Exchange Membrane

The ion-exchange membrane was sandwiched between cylindrical cells, 50 ml water was put in the upper cell, and pressure was applied from above at 0.1 MPa. The amount Wpw of water permeating through the ion-exchange membrane per hour was measured, and the water permeation rate was calculated by the following equation. The effective area of the membrane was 12.6 $cm^2$.

$$\text{Water Permeation Rate (ml/m}^2\text{xhr)}=Wpw/(S\times t)$$

In the parentheses of the equation, S represents the effective area ($m^2$) of the membrane, and t represents the testing time (hour).

3) Ion-Exchange Capacity and Moisture Content of Ion-Exchange Membrane

The ion-exchange membrane was immersed in an aqueous 1 mol/1-HCl solution for 10 hours or longer.

Thereafter, counter ions of the ion-exchange group were replaced from hydrogen ions with sodium ions by an aqueous 1 mol/1-NaCl solution. The released hydrogen ions (Amol) were quantitatively determined by a potentiometric titrator (AT-710, manufactured by KYOTO ELECTRONICS MANUFACTURING CO., LTD.) using an aqueous sodium hydroxide solution.

Subsequently, the same ion-exchange membrane was immersed in the aqueous 1 mol/1-NaCl solution for 4 hours or longer, and then washed sufficiently with ion-exchange water. Thereafter, moisture on the surface of the ion-exchange membrane was wiped off with tissue paper, and the mass (Wg) of the wet membrane was measured. Further, the membrane was dried under reduced pressure at 60° C. for 5 hours, and the dry weight (Dg) thereof was measured. Based on the measured values, the ion-exchange capacity and the moisture content of the ion-exchange membrane were determined by the following equations.

$$\text{Ion-Exchange Capacity}=A\times 1000/D[\text{meq/g-dry mass}]$$

$$\text{Moisture Content}=100\times(W-D)/D[\%]$$

4) Thickness of Ion-Exchange Membrane

The ion-exchange membrane was immersed in an aqueous 0.5 mol/1-NaCl solution for 4 hours or longer, moisture on the surface of the membrane was then wiped off with tissue paper, and the thickness of the ion-exchange membrane was measured with a micrometer (MDE-25MX, manufactured by Mitutoyo Corporation).

5) Electrical Resistance of Ion-Exchange Membrane

The ion-exchange membrane was sandwiched between two chambers of a two-chamber cell having platinum black electrodes, both sides of the ion-exchange membrane were filled with an aqueous 0.5 mol/1-NaCl solution, the resistance between the electrodes at 25° C. was measured by an AC bridge (frequency: 1000 cycles/sec), and the membrane resistance ($\Omega\cdot cm^2$) was determined from the difference between the electrode resistance and a resistance between electrodes without ion-exchange membrane. The ion-exchange membrane used in the measurement was equilibrated in advance in the aqueous 0.5 mol/1-NaCl solution.

6) Current Efficiency of Ion-Exchange Membrane

A two-chamber cell having two chambers sandwiching the ion-exchange membrane was used. The cell was configured of an anode (Pt plate) (aqueous 0.5 mol/1-NaOH solution)/ion-exchange membrane/(aqueous 3.0 mol/1-NaOH solution) and a cathode (Pr plate), and was energized for 1 hour at a liquid temperature of 25° C. at a current density of 10 A/$dm^2$, and the solution near the anode was collected. The concentrations of sodium hydroxide in the collected solution and an initial solution were quantitatively determined by a potentiometric titrator (AT-710, manufactured by KYOTO ELECTRONICS MANUFACTURING CO., LTD.) using an aqueous sulfuric acid solution, and the current efficiency was then calculated by the following equation.

$$\text{Current Efficiency}=(CB-CS/(I\times t/F)\times 100[\%]$$

In the equation, CB represents the concentration of the initial solution, CS represents the concentration of the collected solution after energizing, I represents a current value (A), t represents an energizing time (sec), and F represents a Faraday constant (96500 c/mol).

7) Bursting Strength of Ion-Exchange Membrane

The ion-exchange membrane was immersed in an aqueous 0.5 mol/1-NaCl solution for 4 hours or longer, and then washed sufficiently with ion-exchange water. Subsequently, the bursting strength of the membrane was measured by a mullen burst tester (manufactured by Toyo Seiki Seisakusho, Ltd.) in accordance with JIS-P8112.

Example 1

A monomer mixture having the following composition was prepared.

To 100 parts by mass of a monomer mixture of 58.1 mass % styrene (St), 17.6 mass % chloromethyl styrene (CMS), 8.2 mass % divinylbenzene (DVB, purity: 57%, the balance: ethylvinylbenzene), 13.1 mass % acrylonitrile (AN), and 3.0 mass % α-methyl styrene (α-MeSt), 0.8 parts by mass of ethylene glycol diglycidyl ether, 17.4 parts by mass of acetyl tributyl citrate (ATBC) and 2.0 parts by mass of lauroyl peroxide (PEROYL L manufactured by NOF CORPORATION) were added, and 65.3 parts by mass of vinyl chloride powder (ZEST P22 manufactured by SHINDAI-ICHI VINYL CORPORATION) were further added thereto, which was then stirred for 2 hours, thereby obtaining a homogeneous polymerizable composition.

Then, the following high-density polyethylene monofilament woven fabric (PE33D 120/120) was provided.

High-density polyethylene monofilament woven fabric (PE33D 120/120);

Mesh count: 120

Fiber diameter: 76 μm (33 denier)

Thickness: 132 μm

Open area ratio: 41%

Bursting strength: 1.0 MPa

On the high-density polyethylene monofilament woven fabric (PE33D 120/120), the polymerizable composition obtained above was applied, both surfaces thereof were covered with polyester films as a release agent, which was then pre-heated at 45° C. for 1 hour, and polymerized at 70° C. for 3 hours.

The resultant membranous polymer was sulfonated with chlorosulfonic acid at 40° C. for 45 minutes, thereby obtaining a cation-exchange membrane. The characteristics of the resultant cation-exchange membrane were as follows.

Polyvinyl chloride content in cation-exchange resin: 26.1%

Membrane thickness: 220 μm

Ion-exchange capacity: 2.0 meq./g-dry weight

Moisture content: 47%

Electrical resistance: 1.9 $\Omega\cdot cm^2$

Water permeation rate: 30 ml/($m^2\cdot hr$)

Current efficiency: 74%

Bursting strength: 0.9 MPa

Example 2

A monomer mixture having the following composition was prepared.

To 100 parts by mass of a monomer mixture of 57.9 mass % styrene (St), 19.5 mass % chloromethyl styrene (CMS), 9.1 mass % divinylbenzene (DVB, purity: 57%, the balance: ethylvinylbenzene), 10.5 mass % acrylonitrile (AN), and 3.0 mass % α-methyl styrene (α-MeSt), 0.8 parts by mass of ethylene glycol diglycidyl ether, 13.9 parts by mass of acetyl tributyl citrate (ATBC) and 2.0 parts by mass of lauroyl peroxide (PEROYL L manufactured by NOF CORPORATION) were added, and 63.4 parts by mass of vinyl chloride powder (ZEST P22 manufactured by SHINDAI-ICHI VINYL CORPORATION) was further added thereto, which was then stirred for 2 hours, thereby obtaining a homogeneous polymerizable composition.

Then, the following high-density polyethylene monofilament woven fabric (PE33D 120/120) was provided.

High-density polyethylene monofilament woven fabric (PE33D 120/120);

Mesh count: 120

Fiber diameter: 76 μm (33 denier)

Thickness: 132 μm

Open area ratio: 41%

Bursting strength: 1.0 MPa

A cation-exchange membrane was produced in the same manner as in Example 1 except that the polymerizable composition was changed to the one described above.

The characteristics of the resultant cation-exchange membrane were as follows.

Polyvinyl chloride content in cation-exchange resin: 25.5%

Membrane thickness: 206 μm

Ion-exchange capacity: 2.1 meq./g-dry weight

Moisture content: 38%

Electrical resistance: 2.6 $\Omega\cdot cm^2$

Water permeation rate: 88 ml/($m^2\cdot hr$)

Current efficiency: 83%

Bursting strength: 0.9 MPa

Example 3

A monomer mixture having the following composition was prepared.

To 100 parts by mass of a monomer mixture of 45.4 mass % styrene (St), 19.6 mass % chloromethyl styrene (CMS), 9.1 mass % divinylbenzene (DVB, purity: 57%, the balance: ethylvinylbenzene), 22.9 mass % acrylonitrile (AN), and 3.0 mass % α-methyl styrene (α-MeSt), 0.8 parts by mass of ethylene glycol diglycidyl ether, 17.4 parts by mass of acetyl tributyl citrate (ATBC), 1.0 part by mass of acrylonitrile-butadiene rubber (NBR), and 2.0 parts by mass of lauroyl peroxide (PEROYL L manufactured by NOF CORPORATION) were added, and 72.0 parts by mass of vinyl chloride powder (ZEST PQ135 manufactured by SHINDAI-ICHI VINYL CORPORATION) was further added thereto, which was then stirred for 2 hours, thereby obtaining a homogeneous polymerizable composition.

Then, the following high-density polyethylene monofilament woven fabric (PE33D 120/120) was provided.

High-density polyethylene monofilament woven fabric (PE33D 120/120);

Mesh count: 120

Fiber diameter: 76 μm (33 denier)

Thickness: 132 μm

Open area ratio: 41%

Bursting strength: 1.0 MPa

A cation-exchange membrane was produced in the same manner as in Example 1 except that the polymerizable composition was changed to the one described above.

The characteristics of the resultant cation-exchange membrane were as follows.

Polyvinyl chloride content in cation-exchange resin: 28.7%

Membrane thickness: 219 μm

Ion-exchange capacity: 1.7 meq./g-dry weight

Moisture content: 43%

Electrical resistance: 2.5 Ω·cm$^2$
Water permeation rate: 183 ml/(m$^2$·hr)
Current efficiency: 79%
Bursting strength: 0.9 MPa Example 4

A monomer mixture having the following composition was prepared.

To 100 parts by mass of a monomer mixture of 58.3 mass % styrene (St),
- 19.5 mass % chloromethyl styrene (CMS),
- 9.1 mass % divinylbenzene (DVB, purity: 57%, the balance: ethylvinylbenzene), and
- 13.1 mass % acrylonitrile (AN),
- 0.8 parts by mass of ethylene glycol diglycidyl ether,
- 17.4 parts by mass of acetyl tributyl citrate (ATBC), and
- 2.0 parts by mass of lauroyl peroxide (PEROYL L manufactured by NOF CORPORATION) were added, and
- 55.0 parts by mass of vinyl chloride powder (ZEST P22 manufactured by SHINDAI-ICHI VINYL CORPORATION) was further added thereto,
- which was then stirred for 2 hours, thereby obtaining a homogeneous polymerizable composition.

Then, the following high-density polyethylene monofilament woven fabric (PE33D 100/100) was provided.

High-density polyethylene monofilament woven fabric (PE33D 100/100);
Mesh count: 100
Fiber diameter: 76 μm (33 denier)
Thickness: 132 μm
Open area ratio: 49%
Bursting strength: 0.9 MPa A cation-exchange membrane was produced in the same manner as in Example 1 except that the polymerizable composition was changed to the one described above.

The characteristics of the resultant cation-exchange membrane were as follows.

Polyvinyl chloride content in cation-exchange resin: 23.6%
Membrane thickness: 185 μm
Ion-exchange capacity: 2.3 meq./g-dry weight
Moisture content: 48%
Electrical resistance: 1.7 Ω·cm$^2$
Water permeation rate: 541 ml/(m$^2$·hr)
Current efficiency: 72%
Bursting strength: 0.8 MPa Example 5

A cation-exchange membrane was produced in the same manner as in Example 4 except that the amount of the vinyl chloride powder (ZEST P22 manufactured by SHINDAI-ICHI VINYL CORPORATION) to be added to the monomer mixture was changed to 58.0 parts by mass.

The characteristics of the resultant cation-exchange membrane were as follows.

Polyvinyl chloride content in cation-exchange resin: 24.6%
Membrane thickness: 182 μm
Ion-exchange capacity: 2.3 meq./g-dry weight
Moisture content: 47%
Electrical resistance: 1.8 Ω·cm$^2$
Water permeation rate: 413 ml/(m$^2$·hr)
Current efficiency: 73%
Bursting strength: 0.8 MPa Example 6

A cation-exchange membrane was produced in the same manner as in Example 2 except that the amount of the vinyl chloride powder (ZEST P22 manufactured by SHINDAI-ICHI VINYL CORPORATION) to be added to the monomer mixture was changed to 80.0 parts by mass.

The characteristics of the resultant cation-exchange membrane were as follows.

Polyvinyl chloride content in cation-exchange resin: 30.9%
Membrane thickness: 197 μm
Ion-exchange capacity: 2.1 meq./g-dry weight
Moisture content: 32%
Electrical resistance: 3.1 Ω·cm$^2$
Water permeation rate: 25 ml/(m$^2$·hr)
Current efficiency: 86%
Bursting strength: 0.9 MPa Example 7

A cation-exchange membrane was produced in the same manner as in Example 2 except that the amount of the vinyl chloride powder (ZEST P22 manufactured by SHINDAI-ICHI VINYL CORPORATION) to be added to the monomer mixture was changed to 90.0 parts by mass.

The characteristics of the resultant cation-exchange membrane were as follows.

Polyvinyl chloride content in cation-exchange resin: 33.5%
Membrane thickness: 195 μm
Ion-exchange capacity: 2.1 meq./g-dry weight
Moisture content: 30%
Electrical resistance: 3.3 Ω·cm$^2$
Water permeation rate: 29 ml/(m$^2$·hr)
Current efficiency: 87%
Bursting strength: 1.0 MPa Example 8

A monomer mixture having the following composition was prepared.

To 100 parts by mass of a monomer mixture of 58.1 mass % styrene (St),
- 17.6 mass % chloromethyl styrene (CMS),
- 8.2 mass % divinylbenzene (DVB, purity: 57%, the balance: ethylvinylbenzene),
- 13.1 mass % acrylonitrile (AN), and
- 3.0 mass % α-methyl styrene (α-MeSt),
- 0.8 parts by mass of ethylene glycol diglycidyl ether,
- 17.4 parts by mass of acetyl tributyl citrate (ATBC), and
- 2.0 parts by mass of lauroyl peroxide (PEROYL L manufactured by NOF CORPORATION) were added, and
- 65.3 parts by mass of vinyl chloride powder (ZEST P22 manufactured by SHINDAI-ICHI VINYL CORPORATION) were further added thereto,
- which was then stirred for 2 hours, thereby obtaining a homogeneous polymerizable composition.

Then, the following high-density polyethylene monofilament woven fabric (PE33D 130/130) was provided.

High-density polyethylene monofilament woven fabric (PE33D 130/130);
Mesh count: 130
Fiber diameter: 76 μm (33 denier)
Thickness: 132 μm Open area ratio: 37%

Bursting strength: 1.1 MPa

On the high-density polyethylene monofilament woven fabric (PE33D 130/130), the polymerizable composition obtained above was applied, both surfaces thereof are covered with polyester films as a release agent, which was then pre-heated at 45° C. for 1 hour, and polymerized at 70° C. for 3 hours.

The resultant membranous polymer was sulfonated with chlorosulfonic acid at 40° C. for 45 minutes, thereby obtaining a cation-exchange membrane. The characteristics of the resultant cation-exchange membrane were as follows.

Polyvinyl chloride content in cation-exchange resin: 26.0%

Membrane thickness: 214 μm

Ion-exchange capacity: 2.0 meq./g-dry weight

Moisture content: 41%

Electrical resistance: 2.3 Ω·cm$^2$

Water permeation rate: 32 ml/(m$^2$·hr)

Current efficiency: 78%

Bursting strength: 1.1 MPa

As can be seen from above, the cation-exchange membrane obtained in each of Examples 1 to 8 exhibited low electrical resistance, had a low water permeation rate due to reduction in swelling of the ion-exchange resin, and exhibited excellent properties.

Comparative Example 1

A cation-exchange membrane was produced in the same manner as in Example 4 except that the amount of the vinyl chloride powder (ZEST P22 manufactured by SHINDAI-ICHI VINYL CORPORATION) to be added to the monomer mixture was changed to 45.0 parts by mass.

The characteristics of the resultant cation-exchange membrane were as follows.

Polyvinyl chloride content in cation-exchange resin: 20.2%

Membrane thickness: 185 μm

Ion-exchange capacity: 2.4 meq./g-dry weight

Moisture content: 51%

Electrical resistance: 1.5 Ω·cm$^2$

Water permeation rate: 2102 ml/(m$^2$·hr)

Current efficiency: 67%

Bursting strength: 0.8 MPa

The cation-exchange membrane obtained in Comparative Example 1 in this manner had too small polyvinyl chloride content in the cation-exchange resin. Thus, swelling of the ion-exchange resin could not be reduced sufficiently, and as a result, the water permeation rate was larger than that of the membrane of Example 4.

Comparative Example 2

A cation-exchange membrane was produced in the same manner as in Example 2 except that the amount of the vinyl chloride powder (ZEST P22 manufactured by SHINDAI-ICHI VINYL CORPORATION) to be added to the monomer mixture was changed to 100.0 parts by mass.

The characteristics of the resultant cation-exchange membrane were as follows.

Polyvinyl chloride content in cation-exchange resin: 35.9%

Membrane thickness: 190 μm

Ion-exchange capacity: 2.0 meq./g-dry weight

Moisture content: 28%

Electrical resistance: 3.6 Ω·cm$^2$

Water permeation rate: 18 ml/(m$^2$·hr)

Current efficiency: 87%

Bursting strength: 1.0 MPa

The cation-exchange membrane obtained in Comparative Example 2 in this manner had too large polyvinyl chloride content in the cation-exchange resin, and thus had a significantly increased electrical resistance as compared with the membrane of Example 2 (electrical resistance: 2.6 Ω·cm$^2$).

TABLE 1

| | Composition of Polymerizable Composition (parts by mass) | | | | | | | | | | | |
|---|---|---|---|---|---|---|---|---|---|---|---|---|
| | Aromatic Monomer for Introducing Exchange Group | | Cross-Linkable Monomer | | Other Monomers | | Polyvinyl Chloride Powder | | Other Compounding Agents | | Polymerization Initiator | |
| Ex. | Type | mass % | Type | mass % | Type | mass % | Type | parts by mass | Type | parts by mass | Type | parts by mass |
| 1 | St | 58.1 | DVB | 8.2 | AN<br>CMS<br>α-MeSt | 13.1<br>17.6<br>3.0 | PCV1 | 65.3 | ATBC<br>40E | 17.4<br>0.8 | PL | 2.0 |
| 2 | St | 57.9 | DVB | 9.1 | AN<br>CMS<br>α-MeSt | 10.5<br>19.5<br>3.0 | PCV1 | 63.4 | ATBC<br>40E | 13.9<br>0.8 | PL | 2.0 |
| 3 | St | 45.4 | DVB | 9.1 | AN<br>CMS<br>α-MeSt | 22.9<br>19.6<br>3.0 | PCV2 | 72.0 | ATBC<br>40E<br>NBR | 17.4<br>0.8<br>1.0 | PL | 2.0 |
| 4 | St | 58.3 | DVB | 9.1 | AN<br>CMS | 13.1<br>19.5 | PCV1 | 55.0 | ATBC<br>40E | 17.4<br>0.8 | PL | 2.0 |
| 5 | St | 58.3 | DVB | 9.1 | AN<br>CMS | 13.1<br>19.5 | PCV1 | 58.0 | ATBC<br>40E | 17.4<br>0.8 | PL | 2.0 |
| 6 | St | 57.9 | DVB | 9.1 | AN<br>CMS<br>α-MeSt | 10.5<br>19.5<br>3.0 | PCV1 | 80.0 | ATBC<br>40E | 13.9<br>0.8 | PL | 2.0 |
| 7 | St | 57.9 | DVB | 9.1 | AN<br>CMS<br>α-MeSt | 10.5<br>19.5<br>3.0 | PCV1 | 90.0 | ATBC<br>40E | 13.9<br>0.8 | PL | 2.0 |
| 8 | St | 58.1 | DVB | 8.2 | AN<br>CMS<br>α-MeSt | 13.1<br>17.6<br>3.0 | PCV1 | 65.3 | ATBC<br>40E | 17.4<br>0.8 | PL | 2.0 |
| Comp. Ex. 1 | St | 58.3 | DVB | 9.1 | AN<br>CMS | 13.1<br>19.5 | PCV1 | 45.0 | ATBC<br>40E | 17.4<br>0.8 | PL | 2.0 |

TABLE 1-continued

| | Composition of Polymerizable Composition (parts by mass) | | | | | | | | | | | |
|---|---|---|---|---|---|---|---|---|---|---|---|---|
| | Aromatic Monomer for Introducing Exchange Group | | Cross-Linkable Monomer | | Other Monomers | | Polyvinyl Chloride Powder | | Other Compounding Agents | | Polymerization Initiator | |
| Ex. | Type | mass % | Type | mass % | Type | mass % | Type | parts by mass | Type | parts by mass | Type | parts by mass |
| Comp. Ex.2 | St | 57.9 | DVB | 9.1 | AN<br>CMS<br>α-MoSt | 10.5<br>19.5<br>3.0 | PCV1 | 100.0 | ATBC<br>40E | 13.9<br>0.8 | PL | 2.0 |

St: styrene
DVB: divinyl benzene (purity: 57%, balance: ethylvinylbenzene)
AN: acrylonitrile
CMS: p-chloromethyl styrene
α-MeS: α-methyl styrene
PVC1: polyvinyl chloride powder (trade name: ZEST P22, average degree of polymerization: 1050, manufactured by SHINDAI-ICHI VINYL CORPORATION)
PVC2: polyvinyl chloride powder (trade name: ZEST PQ135, average degree of polymerization: 1350, manufactured by SHINDAI-ICHI VINYL CORPORATION)
ATBC: acetyl tributyl citrate
40E: ethylene glycol diglycidyl ether (trade name: EPOLITE 40E, manufactured by KYOEISHA CHEMICAL CO., LTD)
PL: lauroyl peroxide (trade name: PEROYL L, manufactured by NOF CORPORATION)

TABLE 2

| | | | Characteristics of Ion-Exchange Membrane | | | | | | | |
|---|---|---|---|---|---|---|---|---|---|---|
| Ex. | Polyolefin-based Filament Substrate | Polymerization Temperature [° C.] | Membrane Thickness [μm] | Electrical Resistance [Ω · cm$^2$] | Ion-Exchange Capacity [meq/g-dry mass] | Moisture Content [%] | Water Permeation Rate [ml/m$^2$ · hr] | Current Efficiency [%] | Bursting Strength [MPa] | PVC Content [%] |
| 1 | PE33d 120/120 | 70 | 220 | 1.9 | 2.0 | 47 | 30 | 74 | 0.9 | 26.1 |
| 2 | PE33d 120/120 | 70 | 206 | 2.6 | 2.1 | 38 | 88 | 83 | 0.9 | 25.5 |
| 3 | PE33d 120/120 | 70 | 219 | 2.5 | 1.7 | 43 | 183 | 79 | 0.9 | 28.7 |
| 4 | PE33d 100/100 | 70 | 185 | 1.7 | 2.3 | 48 | 541 | 72 | 0.8 | 23.6 |
| 5 | PE33d 100/100 | 70 | 182 | 1.8 | 2.3 | 47 | 413 | 73 | 0.8 | 24.6 |
| 6 | PE33d 120/120 | 70 | 197 | 3.1 | 2.1 | 32 | 25 | 86 | 0.9 | 30.9 |
| 7 | PE33d 120/120 | 70 | 195 | 3.3 | 2.1 | 30 | 29 | 87 | 1.0 | 33.5 |
| 8 | PE33d 130/130 | 70 | 214 | 2.3 | 2.0 | 41 | 32 | 78 | 1.1 | 26.0 |
| Comp. Ex. 1 | PE33d 100/100 | 70 | 185 | 1.5 | 2.4 | 51 | 2102 | 67 | 0.8 | 20.2 |
| Comp. Ex. 2 | PE33d 120/120 | 70 | 190 | 3.6 | 2.0 | 28 | 18 | 87 | 1.0 | 35.9 |

PE33d 120/120: high-density polyethylene monofilament woven fabric (thickness: 132 μm, mesh count (vertical/horizontal): 120/120, fiber diameter (vertical/horizontal): 76/76 μm, open area ratio: 41%, melting point: 130° C.)
PE33d 100/100: high-density polyethylene monofilament woven fabric (thickness: 132 μm, mesh count (vertical/horizontal): 100/100, fiber diameter (vertical/horizontal): 76/76 μm, open area ratio: 49%, melting point: 130° C.)
PE33d 130/130: high-density polyethylene monofilament woven fabric (thickness: 132 μm, mesh count (vertical/horizontal): 130/130, fiber diameter (vertical/horizontal): 76/76 μm, open area ratio: 37%, melting point: 130° C.)

Other Embodiments

The above embodiments are examples of the invention of the present application, and the invention of the present application is not limited to these examples, and may be combined with or partially replaced with well-known, conventional, and publicly known techniques. Variations readily apparent to those skilled in the art are also included in the invention of the present application.

The invention claimed is:

1. A method of producing a cation-exchange membrane, the method comprising:

impregnating voids of a substrate made of polyolefin-based woven fabric with a polymerizable composition for forming a cation exchange resin, the polymerizable composition containing a polymerization initiator, polyvinyl chloride, and a monomer component which contains a cross-linkable monomer and a monomer containing a sulfonic acid group-introducible functional group or a sulfonic acid group; and copolymerizing the monomer component in the polymerizable composition for forming the cation-exchange resin after the immersing, wherein, the copolymerizing is performed at 40° C. or higher to lower than 80° C., the polymerizable composition for forming the cation-exchange resin containing 55 parts by mass or more to 98 parts by mass or less of the polyvinyl chloride relative to 100 parts by mass of the monomer component, wherein:

the monomer component includes a-alkylstyrene, and a content of the α-alkylstyrene is 1 mass % or more to 13 mass % or less relative to the entire monomer component.

2. The method of claim 1, wherein:

the substrate is made of polyethylene-based woven fabric.

3. The method of claim 1, wherein:

the monomer containing the sulfonic acid group-introducible functional group or the sulfonic acid group is a styrene-based monomer containing a sulfonic acid group-introducible functional group or a sulfonic acid group.

* * * * *